3,163,811
MACHINE TOOL
Benjamin Vaucher, Tramelan, Switzerland, assignor to Kummer Freres S.A. Fabrique de Machines, Tramelan, Switzerland, a joint-stock company
Filed Mar. 8, 1961, Ser. No. 94,231
Claims priority, application Switzerland, Mar. 31, 1960, 3,619/60
2 Claims. (Cl. 318—275)

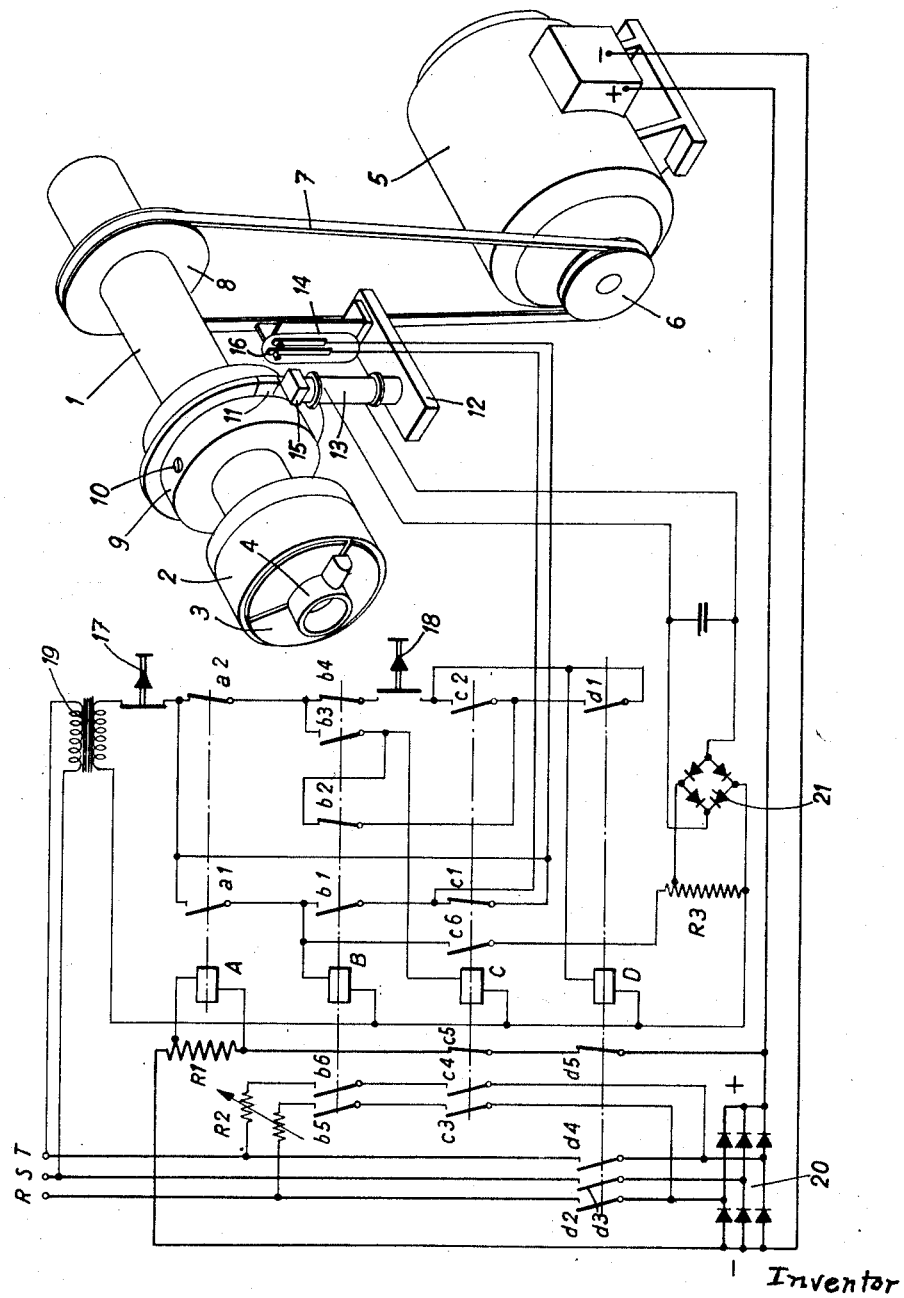

This invention relates to machine tools and in particular to machine tools with a workpiece driving spindle such as automatic lathes.

Numerous machine tools with a workpiece driving spindle, which are known in the art, are provided with electric controlling means to control a main power plant either in a partly automatic or even in a wholly automatic manner, with a controlling or cycling device, either mechanical or of another type, to control the machining operations of the machine tool according to a predetermined cycle, and with a workpiece feeding device which is automatically actuated at the end of each machining cycle, to introduce a new workpiece into the gripping means provided on the spindle. These known machine tools are fully efficient as long as the workpieces to machine therewith are cylindrical since the said automatic feeding device can introduce these cylindrical workpieces into the gripping means of the spindle when the latter has been stopped in any position about its axis.

With a workpiece having a shaped contour the gripping means of the spindle must, however, be provided with a correspondingly shaped lodging to receive said workpiece and it is therefore usually no longer possible to use an automatic workpiece feeding device in combination with a machine tool of the type indicated.

One object of the invention is accordingly to improve the machine tools of said type so as to enable using an automatic workpiece feeding device in combination therewith, even when the workpieces to machine have an irregularly shaped contour.

It is also an object of the invention to provide a machine tool of the type indicated with stopping and orienting means acting on the spindle to bring the latter in a position around its axis corresponding to that of the workpieces fed by the automatic feeding device.

Still another object of the invention is to provide a machine tool with means arranged for stopping the spindle in a predetermined position around its axis, thus enabling the introduction of a new shaped workpiece into a correspondingly shaped lodging of the gripping means of the spindle by merely shifting said workpiece along the spindle axis.

Further objects of the invention will become apparent in the course of the following description.

One embodiment of the machine tool according to the invention is represented diagrammatically and by way of example in the annexed drawings.

In the drawings:

The single figure is a partial perspective view of some mechanical elements of the machine tool improved in accordance with the invention and it simultaneously shows a part of the wiring diagram of an electromagnetic device automatically controlling the operation of said machine tool.

The machine tool represented comprises a spindle 1 arranged in a headstock frame (not shown) for rotation about its longitudinal axis. At its front end this spindle 1 carries gripping means 2 comprising a chuck 3 provided with a shaped lodging to grip a workpiece 4 having a correspondingly shaped contour. The spindle 1 is driven in rotation by means of a direct current motor 5 through belt transmitting means 6, 7, 8.

A ring member 9 preferably of brass is mounted on spindle 1 so that it can be set in any desired position around the spindle. A screw 10 enables reliably securing ring 9 on to spindle 1 in the position it has just been set. A small ferromagnetic piece 11, preferably of soft iron, is mounted on ring 9 in fixed relationship thereto.

Piece 11 will preferably be embedded in ring member 9, but it can also advantageously be set in a cutout of an outwardly extending peripheral rim portion of member 9. Since piece 11 is located in an eccentric position with respect to spindle 1, it revolves around the spindle axis when the latter is rotating. During that motion, piece 11 thus travels along a circular path coaxial to spindle 1. By rotating member 9 around spindle 1, the ferromagnetic piece 11 can be set in any desired position therearound, thus determining with precision, as disclosed hereinafter, the position in which the spindle will have to be stopped to permit a quite conventional automatic loading or feeding device (not shown) of introducing a shaped workpiece such as shown at 4 into the correspondingly shaped lodging of chuck 3 by merely shifting said workpiece along the spindle axis.

An electromagnet 13 and a vacuum-break magnetic control switch 14, both forming part of electromagnetic means provided, in combination with piece 11, for stopping the spindle 1 in the desired workpiece receiving position, are mounted on a soft iron plate 12 fixed to the framework of the headstock (not shown) which carries spindle 1. The pole 15 of magnet 13 extends on the front side of the travelling path of piece 11, in the immediate vicinity of said path, while the movable contact 16 of switch 14 extends on the rear side of said path also in the immediate vicinity thereof.

Pole 15 and contact 16 form part of a magnetic circuit, when magnet 13 is energized, said circuit being closed and producing an attraction of contact 16, thus opening switch 14, upon arrival of piece 11 between the pole 15 and contact 16. The magnet 13 and the switch 14 themselves form part of an electric control device which will now be described in detail.

This control device is fed by a three-phase alternating current supplied at terminals RST. It comprises at first a main circuit feeding motor 5 with direct current through a rectifier 20 when the contacts d2, d3, d4 are closed. When motor 5 is energized by this main circuit, it rotates at high speed thus enabling machining operations of the tools on the workpiece 4.

The electric control device represented also comprises an auxiliary circuit to drive the motor 5 at low speed when the spindle 1 has to be oriented and stopped in its loading position. This motor feeding auxiliary circuit is insered between the mains connected to terminals RT and it comprises the contacts c3, c4, b5, b6 and the variable resistors R2.

It will be observed that this auxiliary circuit also feeds motor 5 through rectifier 20. When said auxiliary circuit is energized, there are, however, only two of the three sections of rectifier 20 which are operative. The motor 5 is therefore running at a speed substantially smaller than when it is fed by its main circuit.

The electric control device of the machine tool improved according to the invention further comprises a braking circuit connected in series with motor 5 and comprising contacts c5, d5, a resistor R1, and the coil of a relay A. This relay A forms part of means controlling the operation of the different circuits described above, said controlling means being fed from a derivation of the mains connected to terminals ST through a transformer 19, and said controlling means further comprising three relays B, C, D, an auxiliary rectifier 21 to energize magnet 13, a main switch 17 and a starting switch 18.

The electric control device described functions as follows:

As soon as a workpiece 4 has been fed to chuck 3, the starting switch 18 is closed, thus causing the motor 5 to be driven at high speed for machining said workpiece. The switch 18 could be closed manually, if the workpiece were fed by hand, but it will preferably be actuated automatically by the mechanic cycling means of the machine controlling the machining operations thereof in the conventional manner, said cycling means accordingly comprising for instance a cam to close switch 18 as soon as a new workpiece has been fed to and gripped by chuck 3.

Closing switch 18 causes the controlling current supplied by transformer 19 at a potential of 60 volts, to pass through the main switch 17, the contacts $a2$ and $b4$ and switch 18, and to energize relay D, thus closing the contacts $d2$, $d3$ and $d4$ of the motor feeding main circuit. As already described above, the direct current supplied then by rectifier 20 causes the motor 5 to rotate at high speed. The auxiliary contact $d1$ of relay D, which has been closed upon energization of this relay, energizes itself relay C through contact $b2$. This relay C closes the two contacts $c3$, $c4$ of the motor feeding auxiliary circuit. Since contacts $b5$, $b6$ are, however, open, said auxiliary circuit is not yet closed. The energization of relays D and C opens the contacts $d5$ and $c5$ and breaks accordingly the braking circuit connected in series with motor 5. By means of the contact $c2$ relay C further closes its upkeeping circuit through contact $b2$.

When the workpiece 4 has been fully machined, the cycling means of the machine open switch 18 thus interrupting the energizing current of relays D and C. The motor feeding main circuit is thus interrupted by the three contacts $d2$, $d3$ and $d4$. At the same time the contacts $d5$ and $c5$ close the braking circuit of the motor, which energizes relay A. As long as direct current flows through the braking circuit, the relay A will remain energized, so that the contacts $a2$ and $a1$ of this relay will be opened and closed, respectively. The controlling current of transformer 19 thus passes during braking through the contact $a1$ and energizes relay B. The latter closes its contacts $b5$ and $b6$ of the motor feeding auxiliary circuit. Since contacts $c3$ and $c4$ are open during braking, said auxiliary circuit does not yet become operative.

Relay B remains energized by means of its upkeeping contact $b1$ both through contact $c1$ and through the magnetic switch 14, which is also closed. By means of its contact $b4$ relay B avoids any accidental energization of relay D, and consequently of the motor feeding main circuit, which could occur upon an inopportune closure of switch 18, thus preventing motor 5 from rotating at high speed before a new workpiece has been fed. The opened contact $b2$ of relay B also avoids accidentally energizing relay D upon closure of starting switch 18. During the braking cycle relay B prepares energizing relay C through its contact $b3$.

After motor 5 and spindle 1 have been braked, no current passes any more through the braking circuit so that relay A is released. Contact $a2$ thus closes the energizing circuit of relay C through contact $b3$, which has been closed during braking. Relay C itself closes the contacts $c3$ and $c4$ while simultaneously opening contact $c5$. Since the motor feeding auxiliary circuit is now operative through the closed contacts $b5$, $b6$ and $c3$, $c4$, it will drive the motor 5 at low speed as explained above. This low speed drive of motor 5 permits orienting spindle 1. At the same time the transformer 19 feeds the auxiliary rectifier 21 through switch 16, contacts $b1$, $c6$ and potentiometer R3, thus energizing magnet 13. The latter is thus energized only when spindle 1 is actually driven at low speed. Any useless actuation of the vacuum-break magnetic switch 14 will therefore be avoided. The latter remains operative only during a relatively short period, after each machining cycle, so that it is not subjected to a great wear. The potentiometer R3, connected to the energizing circuit of magnet 13, permits adjusting the potential supplied to said magnet.

When the ferromagnetic piece 11 comes between pole 15 of magnet 13 and contact 16 of switch 14, this contact will be attracted and switch 14 opened, thus breaking the energizing circuit of relay B. This relay then opens contact $b1$ and interrupts its upkeeping circuit. Relay B also immediately interrupts the energizing circuit of relay C by means of its contact $b3$. Contacts $c3$ and $c4$ are accordingly opened and the auxiliary feeding circuit actuating motor 5 at low speed is also interrupted. The motor braking circuit is at the same time closed again through contacts $c5$ and 5, so that the motor 5 is subjected to a short braking action which will stop spindle 1 while piece 11 is still between pole 15 and contact 16. This braking action is however very small and the corresponding current passing in the braking circuit does not energize relay A so that contacts $a1$ and $a2$ thereof remain in the position represented in the drawings.

A cam (not shown) belonging to the mechanic cycling means controlling the operation of the whole machine tool can now actuate the feeding device thereof to load a new workpiece into the shaped lodging of chuck 3, thus preparing the machine for a new operating cycle. It will be observed that the time elapsing between the actuation by said cycling means of starting switch 18 and that of the feeding device loading a new workpiece to spindle 1 has to be chosen long enough to enable the electric control device of the machine to brake the spindle and to orient the same in the loading position.

The electric control device described hereabove has the following advantages:

(1) After having machined a workpiece the motor 5 driving spindle 1 is braked until it is almost stopped.

(2) As soon as spindle 1 has been stopped, a set of relays starts an orienting cycle by closing an auxiliary circuit driving motor 5 at low speed.

(3) An electromagnetic device becomes operative upon the passage of a ferromagnetic piece 11 fixed to the spindle and stops the low speed motion both of motor 5 and spindle 1.

(4) The position of piece 11 can be set around spindle 1 in any desired position, so as to stop the latter in any predetermined position around its axis.

(5) The spindle orienting means are arranged so as to prevent motor 5 from rotating at high speed before spindle 1 has been oriented.

(6) The speed of spindle 1 during orienting can easily be adjusted at any desired value.

(7) During machining a workpiece the device controlling the low speed motion of spindle 1 is completely deenergized so that the various members actuated by said device are neither subjected to strains nor wear.

Various modifications of the embodiment described above will become apparent to those skilled in the art. The direct current motor 5 could, for instance, be replaced by a three-phase current motor, its drive at low speed being then ensured by a low frequency oscillating circuit, for instance a circuit oscillating at a frequency substantially equal to 1 Hz.

Although one particular embodiment of my invention has been described above with reference to the drawings, it should be understood that I do not wish to be limited to the details thereof except as defined by the appended claims.

I claim:

1. A power control stop for a rotatable spindle arranged for rotation about an axis, a direct current motor to drive said spindle and electromagnetic means comprising a ferromagnetic piece fixed on the periphery of said spindle and revolving therearound along a predetermined circular path when said spindle is rotating, a fixed electromagnet having a pole extending on one side of said circular predetermined path and spaced adjacent thereto, a fixed magnetic control switch having a movable contact facing said pole of the electromagnet and extending on the opposite side of and in alignment with said pole, a motor feeding main circuit to cause said motor to rotate at high speed, a motor feeding auxiliary circuit to cause said motor to rotate at a constant low speed, a braking circuit to brake said motor, and controlling means energized by said braking circuit to switch off immediately said motor feeding main circuit, to switch on said motor feeding auxiliary circuit after said braking circuit has braked said motor and to energize said electromagnet, said magnetic switch switching off said motor feeding auxiliary circuit upon arrival of said ferromagnetic piece between said movable contact of the magnetic switch and said pole of the electromagnet, when the latter is energized.

2. A power control stop according to claim 1, wherein said braking circuit is provided with a resistor, said resistor being connected in parallel to the terminals of said direct current motor when said braking circuit is switched on, said controlling means being energized by the voltage drop across said resistor.

References Cited by the Examiner
UNITED STATES PATENTS

| | | | |
|---|---|---|---|
| 2,191,137 | 2/40 | Trible | 82—28 |
| 2,338,975 | 1/44 | Schumacher | 82—28 |
| 2,753,502 | 7/56 | Kylin | 318—26 |
| 3,017,555 | 1/62 | Newman et al. | 318—380 |

FOREIGN PATENTS 147,548  11/54  Sweden.

ORIS L. RADER, *Primary Examiner.*

RICHARD H. EANES, JR., *Examiner.*